Oct. 14, 1952  R. F. TERNES  2,613,392
APPARATUS FOR MANUFACTURING INNER TUBES
Filed June 21, 1949  2 SHEETS—SHEET 1
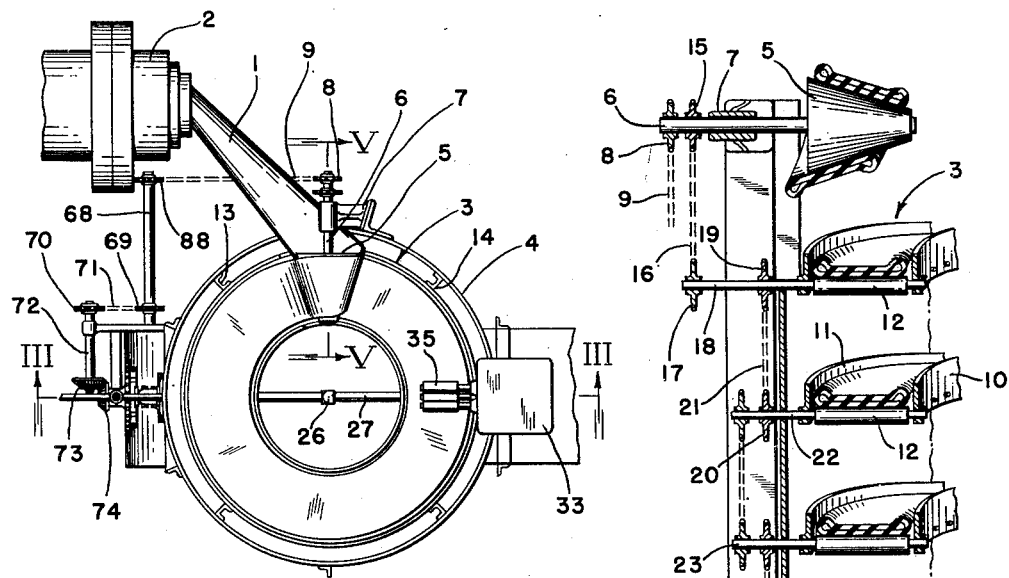
Fig. 5
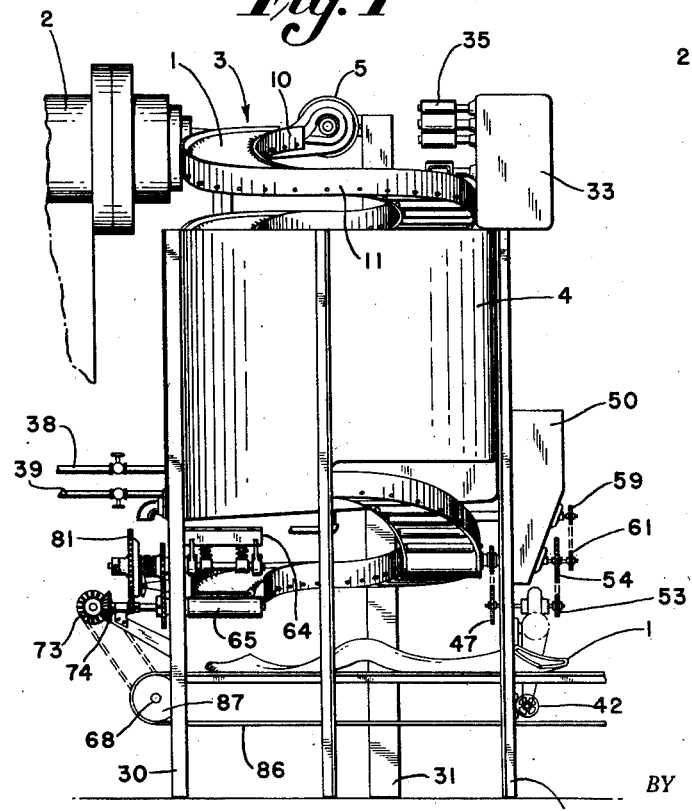
Fig. 1
Fig. 2
INVENTOR.
RAYMOND F. TERNES
BY Henry P. Truesdell
ATTORNEY.

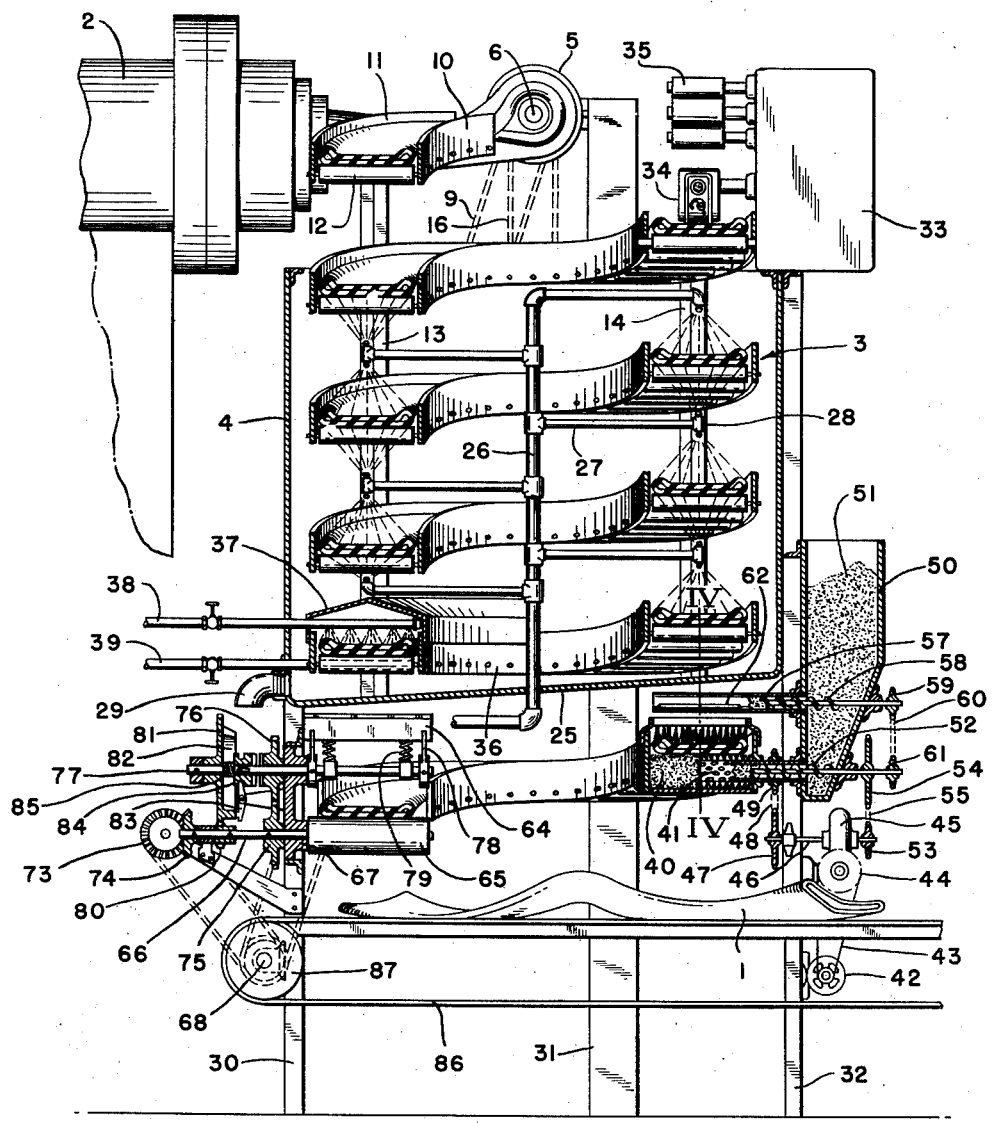
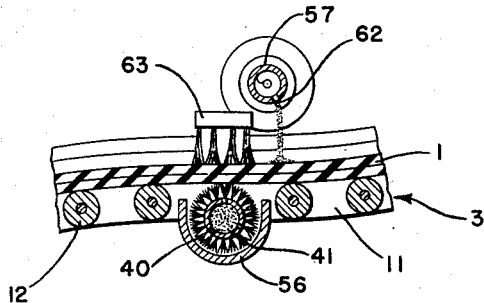

Patented Oct. 14, 1952

2,613,392

UNITED STATES PATENT OFFICE 2,613,392

APPARATUS FOR MANUFACTURING INNER TUBES

Raymond F. Ternes, Detroit, Mich., assignor to United States Rubber Company, New York, N. Y., a corporation of New Jersey Application June 21, 1949, Serial No. 100,348

12 Claims. (Cl. 18—2)

This invention relates to an apparatus for manufacturing inner tubes for pneumatic tires.

In the manufacture of such tubes, it has heretofore been the practice to extrude the inner tube from a tuber to form a continuous straight length of tubular stock. After extrusion the wall of the tube collapses to flat shape. It is subsequently cut and spliced together to form the annular configuration of the tube. One of the objections to the manufacture of tubes by this method is that the rim circumference and the outer circumference of the tube when spliced together are substantially the same since the unvulcanized tube lies flat during the splicing operation. When such a tube is vulcanized the outer circumference of the tube, being of larger diameter, is expanded resulting in a thinned out wall portion. This is objectionable because the thin spots may result in premature failure of the inner tube. Furthermore, the thin spots are usually localized so that it becomes difficult to provide a balanced tube.

In accordance with the practice of my invention, I provide an apparatus for manufacturing inner tubes in which the tube, after it leaves the extruder, is caused to assume a curved form, thus forming a difference in the rim and outer diameters of the tube and avoiding the difficulties encountered in straight extrusion. By withdrawing the inner tube stock from the extruder at an angle to the face of the extruder die, a uniformity is obtained throughout the thickness of the wall of the tube as it is shaped to circular form. By providing a helical conveyor having its axis in a vertical plane, the extruded inner tube stock may be taken directly from the tuber and onto the helical conveyor where it is subjected to further processing. This processing includes the application of printed indicia on the inner tube, cooling the inner tube, drying the tube, coating the inner tube with a lubricating powder, cutting the tube to proper length, and depositing the cut length of tube onto a conveyor where it is moved for further processing.

The object of my invention is to provide an apparatus in which inner tubes may be extruded and shaped to circular form prior to vulcanization in an efficient and economical manner. Among the purposes and advantages of my invention are to provide a new and improved method and apparatus for manufacturing inner tubes in which thin spots in the inner tube are eliminated; in which printed indicia may be easily applied to the inner tube during its continuous movement; to provide an arrangement whereby the inner tube stock may be effectively cooled, dried and coated with a lubricant; and to provide an arrangement which extrudes inner tubes in a continuous path and in circular or curved formation and delivers the stock cut to proper length for subsequent processing.

These and other objects and advantages will appear more fully in the following detailed description when considered in connection with the accompanying drawings; in which:

Fig. 1 is a plan view of an apparatus forming an embodiment of my invention;

Fig. 2 is a side elevational view thereof;

Fig. 3 is an enlarged transverse view, in section, taken along lines III—III of Fig. 1;

Fig. 4 is a portion of a view, in section, taken along lines IV—IV of Fig. 3 illustrating the application to the inner tube of a powdered lubricant; and Fig. 5 is a view, in section, of a portion of the conveyor taken along lines V—V of Fig. 1.

With reference to the drawing and, in particular, to Figs. 1 and 2, I show an embodiment of my invention wherein inner tube stock 1 is extruded in circular shape in cross-section from a tuber 2 and conducted to a helical conveyor 3 supported in a conveyor housing 4. The extruder 2 is of a conventional type used in the manufacture of inner tubes ordinarily extruded in a continuous straight length. It has been found that, if, instead of extruding the inner tube stock in a straight line the stock is conveyed in a diagonal direction after leaving the die it will assume a curved or circular path. This is due principally to the fact that, as the stock is pulled free at the extruder die, a greater amount of stock will flow at that portion of the die where the stock is being pulled or moved faster away from the die. As a result of such a condition, a uniformity in the thickness of the wall of the tubular stock is obtained notwithstanding the difference between the inner and outer circumferences of the curved stock which correspond to the rim and outer diameters of the tube when mounted in a tire casing.

As the stock leaves the tuber die, it is engaged by a conical driven roller 5. A shaft 6 supports the roller 5, and a bracket 7 attached to the housing 4 supports the shaft 6. A sprocket 8 also connects with the shaft 6 and by means of a chain 9, connected to a power source hereinafter described, operates to rotate the conical roller 5 for withdrawing the inner tube stock 1 from the tuber tube. The conical roller is driven at such a speed as to provide a slight tension of the stock between the roller and the tuber head. Such a condition allows the rubber stock to flow freely from the tuber die in accordance with the tension under which the stock is withdrawn from the die. Because of the difference in diameters of the opposite ends of the conical roller, the roller pulls one side of the tuber stock faster than the other side. That portion which moves faster relieves the rubber stock at the point where it is being extruded and the pressure within the extruder is sufficient to force a greater amount of the rubber stock from that portion of the tuber die which is relieved by the tension of the stock being withdrawn therefrom. This provides for a tubular stock of uniform thickness throughout the circumference thereof. In addition, the conical roller withdraws the stock from the tuber die in a manner such that the stock assumes a curved or circular formation. This is due to the fact that the larger diameter of the roller pulls more stock from the extruder so that it provides the outer circumference of the curved stock which, of course, is of greater length than the inner circumference pulled by the smaller diameter of the roller. As the stock reverses itself over the surface of the conical roller it assumes a curved or circular form, as shown most clearly in Fig. 1.

The relationship between the conical roller 5 and the tuber is such that the lower outer surface of the conical roller is in substantially the same horizontal plane as the tuber die. If the surface of the roller were located above or below the horizontal, the stock would not be pulled from the far side of the tuber die, looking at Fig. 1, at the fastest rate in order to form the outer circumference of the circular stock; instead, it would be pulled at the fastest rate from some point above or below this point resulting in distortion of the curved or circular configuration. In addition, a line drawn from the center of the tuber exit to the center of the conical roller forms an angle of substantially 45° as measured from the central axis of the extruder. This arrangement results in the proper formation of the inner tube so that it will assume a substantially circular path.

Directly after the inner tube stock leaves the conical roller 5, the stock is laid onto the helical conveyor 3. This is shown in detail by Fig. 3. Essentially, the helical conveyor consists of a plurality of convolutions of a conveyor in a helical path on a vertical axis. The conveyor includes inner and outer side frames 10 and 11, respectively, and a plurality of rollers 12 positioned between the frame members 10 and 11. Structural members 13 and 14 are attached to the frame 11 for supporting the conveyor 3 within the housing 4; they support the side frames 10 and 11. The pitch of the helix of the conveyor is such that the inner tube will travel downward by gravity on the conveyor 3. However, if desired, certain of the rollers of the conveyor 3 may be power driven so as to provide a more positive action of the movement of the inner tube relative to the conveyor. This may be accomplished, as shown in Fig. 5, by providing a sprocket 15 keyed to the shaft 6. Through a chain 16 and sprocket 17 keyed to a shaft 18, one of the rollers 12 is driven. Additional rollers may also be driven by providing a sprocket 19 on the shaft 18 communicating with a sprocket 20 through a chain 21. This causes rotation of the roller 12 mounted on the shaft 22. In a similar manner, the rollers 12 mounted on shafts 23 and 24 are also rotated.

Since it is desirable to cool the inner tube stock, such as by a spray of water, it is necessary that the conveyor 3 be at least partially confined by the housing 4. The housing 4, therefore, provides a circular enclosure and includes a bottom wall 25 (Fig. 3). Extending axially through the center of the housing 4 is a conduit 26 having extension conduits 27 projecting therefrom. The ends of these conduits are provided with spray heads 28 from which cold water is directed against both the top and the underside of the inner tube stock as it moves along the conveyor. A drain 29 is located near the bottom of the housing 4 for the purpose of carrying away any accumulation of the cooling water. The housing 4 is supported from the floor by a plurality of vertical structural members such as 30, 31 and 32. Supported by the housing 4 is a printing device 33 including a rotatable type platten 34 and inking rollers 35. This printing device also includes a timing arrangement whereby the desired indicia is printed onto the inner tube at predetermined intervals. An example of such a printing device substantially identical to the present adaptation is disclosed in the patent to Cady, No. 2,061,893, issued November 24, 1936.

After the inner tube is properly cooled, it is necessary to dry the inner tube stock. This is accomplished at the lower end of the conveyor housing 4. At this location a portion 36 (Fig. 3) of the helical conveyor 3 is positioned on a straight horizontal plane as distinguished from the helical path so that it takes a circular configuration. This is desirable so as to prevent the water from the spray conduits from running down the surface of the inner tube by gravity. This provides an opportunity for the water to be removed by an air blast as described hereafter. As an additional protection in keeping the water off the inner tube, at this location a roof 37 is placed over this portion 36 of the conveyor 3. In order to dry the inner tube a pair of conduits 38 and 39 project above and below the inner tube respectively and beneath the roof 37. Each of these conduits 38 and 39 is provided with a plurality of openings facing the inner tube. The conduits are connected to a source of compressed air and jets of compressed air are emitted from the openings adjacent the inner tube. This air provides sufficient force to drive off and remove any surface water on the inner tube. Thereafter the inner tube continues and assumes the helical path of the conveyor. At this point, and as shown in Fig. 2, the conveyor 3 emerges from the confines of the housing 4 where the dry tube and the dry conveyor continue in a helical path below the housing.

Directly below the housing 4 is an arrangement for lubricating the surface of the inner tube. This is accomplished by applying to both the upper and lower surface of the tube a powdered substance such as soapstone or mica. The bottom surface of the inner tube is dusted with soapstone by providing a rotatable brush 40 (Figs. 3 and 4) in engagement with the underside of the inner tube. The brush 40 is supported by a hollow perforated tube 41 which is driven from a motor 42 through a belt 43, pulley 44 and reduction drive 45. A shaft 46 extending from the reduction drive 45 connects with a sprocket 47 which through a chain 48 joins a sprocket 49 attached to the tubular shaft 41. By this arrangement, the brush 40 rotates slowly and continuously throughout the operation of the apparatus. A hopper 50 attached to the vertical structural support 32 contains a supply of soapstone 51. Near the bottom of the hopper is an extrusion screw 52 open to the hopper and extending part way into the tubular shaft 41. This screw 52 is rotated by means of a sprocket 53 attached to the shaft 46, a sprocket 54 carried by the screw 52 and an interconnecting chain 55. The screw 52 is thus rotated slowly so as to force a quantity of soapstone into the interior of the hollow tube 41 where the particles drop out of the perforations in the tube and are carried by the brush 40 into engagement with the underside of the inner tube. A shield 56 extending part way around the brush 40 collects particles of the dust that would otherwise drop away from the brush and otherwise positions the dust for application to the tube.

The upper portion of the tube is dusted by means of powder dropped onto the inner tube from a conduit 57 communicating with the hopper 50. A screw 58 communicating with the hopper and extending part way into the conduit 57 is slowly rotated by means of a sprocket 59 and chain 60 connected to a sprocket 61 attached to the shaft of the screw 52. The conduit 57 is provided with a slot 62 from which the particles of powder are ejected and dropped onto the surface of the inner tube. A stationary brush 63 positioned on the top of the inner tube and at a point after the powder is dropped onto the inner tube provides means for spreading the powder uniformly over the face of the inner tube. After the inner tube is thus treated during a continuous movement along the conveyor the tube passes on to the next operation.

As the inner tube leaves the dusting station, it moves progressively toward the last step of the process which consists of severing the continuous strip of inner tube stock into proper lengths. This cutting mechanism is intended to sever the inner tube at predetermined periods so that the tube will be of sufficient length to form a complete annulus while allowing sufficient excess stock for splicing the tube. Essentially, the cutting apparatus consists of a knife blade 64 capable of rotating so as to engage the inner tube 1 and sever same as it moves over the anvil roll 65. The roll 65 is supported on a shaft 66 mounted in a bracket 67 attached to the vertical structural member 30. The shaft 66 is driven from a main conveyor drive shaft 68 through sprockets 69 and 70 and a chain 71 (see Fig. 1). A shaft 72 on which the sprocket 70 is mounted is also attached to a bevel gear 73 which meshes with a bevel gear 74 keyed to the shaft 66. By these drive connections the roller 65 is driven continuously throughout the operation of the apparatus.

In order to drive the knife 64, a gear 75 is keyed to the shaft 66 and meshes with a gear 76 freely rotatable upon a shaft 77 which supports the blade 64. A pair of brackets 78 having slideways for the reception of the knife blade 74 is attached to the shaft 77 to form the support for the knife blade. Also, a pair of springs 79 provide a pressure resiliency between the shaft 77 and the knife blade 64 so as to insure a pressure engagement of the knife blade 64 with the anvil roller 65. If desired, the knife blade 64 may be electrically heated in accordance with conventional practices.

In order to actuate the knife blade 64 at the proper timing cycle, I provide a timing and actuating device consisting of a drive gear 80 keyed to the shaft 66 which meshes with a gear 81 freely rotatable on the shaft 77. The gear 81 includes a cam 82 attached thereto for the purpose of actuating an arm 83 supported from the main structural member 30. The arm 83 is of the pivoted type and is adapted to engage a sliding clutch 84 keyed to the shaft 77 by means of a conventional spline or slidable keyway. A spring 85 positioned around the shaft 77 between the gear 81 and the clutch 84 operates normally to engage the clutch 84 with the gear 76 thus locking the gear with the shaft 77 so as to bring the knife blade 74 in cutting engagement with the inner tube. The clutch 84 and the gear 76 are provided with toothlike surfaces which function as a positive clutch for effecting the drive between the shafts 66 and 77.

When the knife blade 64 cuts the inner tube and makes one complete revolution, the cam 82 actuates the arm 83 and disengages the clutch 84 from the gear 76. The knife, therefore, comes to rest until the spring 85 causes the clutch 84 to engage the gear 76 in the next succeeding cycle of operation.

Positioned directly below the anvil roller 65 is a conveyor belt 86 supported by a roller 87 keyed to the shaft 68 and supported by the structural member 30. The conveyor 86 is driven at the desired speed by a conventional motor and reduction means, not shown. When a proper length of inner tube is cut from the continuous strip of tube, it drops from the anvil roller 65 onto the conveyor belt 86 from whence it is carried to the next operation, such as splicing. The shaft 68 of the conveyor 86 also supports a sprocket 88 which meshes with the chain 9 for driving the conical roller 5 and the driven conveyor rollers 12.

As thus shown and described, I have provided a novel arrangement whereby a continuous length of inner tube may be withdrawn from an extruding tuber in helical formation in such a manner as to permit the application of printed indicia thereon, cooling the tube, drying it, lubricating its surface, cutting it into proper length and delivering the so treated tube to a subsequent operation. One advantage of providing a conveyor to support the tube stock during these processing operations is that the stock is not subjected to strains or distortions and travels down the helical conveyor in a relaxed state so that the dimensions and characteristics of the wall of the tube stock remain unchanged. Moreover, by providing a conveyor in a helical path, the initial curvature of the tube imparted by the conical roller and tuber is retained throughout the subsequent processing steps.

While I have shown a preferred embodiment of my invention, it is to be understood that it may be subject to modifications as appearing in the spirit of the invention and the scope of the appended claims.

Having thus described my invention, what I claim and desire to protect by Letters Patent is:

1. An apparatus for manufacturing inner tubes comprising, a horizontally disposed tuber for extruding inner tube stock in a substantially circular cross-section, a helical conveyor having a vertical axis, said conveyor comprising a series of closely spaced rollers arranged in a continuously and progressively descending path extending spirally around said vertical axis, to provide a series of rolling surfaces along which the extruded stock moves in a continuous downwardly spiral path, and a driven conical roller positioned above the helical conveyor and adapted to direct the stock from the tuber to the conveyor.

2. An apparatus for manufacturing inner tubes comprising, a horizontally disposed tuber for extruding at its outlet inner tube stock in a substantially circular cross-section, a helical conveyor having a vertical axis, said conveyor comprising a series of closely spaced rollers arranged in a continuously and progressively descending path extending spirally around said vertical axis, to provide a series of rolling surfaces along which the extruded stock moves in a continuous downwardly spiral path, and a driven conical roller positioned above the helical conveyor and adapted to place the stock from the tuber onto the conveyor, the conical roller being positioned in a diagonal path relative to the axis of the tuber outlet.

3. An apparatus for manufacturing inner tubes comprising, a horizontally disposed tuber for extruding at its outlet inner tube stock in a substantially circular cross-section, a helical conveyor having a vertical axis, said conveyor comprising a series of closely spaced rollers arranged in a continuously and progressively descending path extending spirally around said vertical axis, to provide a series of rolling surfaces along which the extruded stock moves in a continuous downwardly spiral path, and a driven conical roller positioned above the helical conveyor and adapted to direct the stock from the tuber to the conveyor, the conical roller being positioned in a diagonal and substantially horizontal path relative to the axis of the tuber outlet.

4. An apparatus for manufacturing inner tubes comprising, a horizontally disposed tuber for extruding at its outlet inner tube stock in a substantially circular cross-section, a helical conveyor having a vertical axis, said conveyor comprising a series of closely spaced rollers arranged in a continuously and progressively descending path extending spirally around said vertical axis, to provide a series of rolling surfaces along which the extruded stock moves in a continuous downwardly spiral path, and a driven conical roller positioned above the helical conveyor and adapted to pull stock from the tuber and direct it onto the conveyor, the pitch of the helix of the conveyor being such that the inner tube stock moves by gravity along the conveyor.

5. An apparatus for manufacturing inner tubes comprising, a horizontally disposed tuber for extruding at its outlet inner tube stock in a substantially circular cross-section, a helical conveyor having a vertical axis, a driven conical roller positioned above the helical conveyor and adapted to pull stock from the tuber and direct it onto the conveyor, and a plurality of rollers forming the conveyor support for the inner tube stock, at least some of said rollers being driven for assisting in moving the stock along the conveyor said rollers being closely spaced and arranged in a continuously and progressively descending path extending spirally around said vertical axis to provide a series of rolling surfaces along which the extruded stock moves in a continuous downwardly spiral path, and a vertical guide member arranged along each of the edges of the said rollers, said guide members being spaced according to the width of the extruded stock for guiding the stock along the surface of the rollers.

6. An apparatus for manufacturing inner tubes comprising, a horizontally disposed tuber for extruding at its outlet inner tube stock in a substantially circular cross-section, a helical conveyor having a vertical axis, said conveyor comprising a series of closely spaced rollers arranged in a continuous and progressively descending path extending spirally around said vertical axis, to provide a series of rolling surfaces along which the extruded stock moves in a continuous downwardly spiral path, a driven conical roller positioned above the helical conveyor and adapted to direct the stock from the tuber to the conveyor, a housing forming a bottom and side enclosure from the principal portion of the helical conveyor, and conduits positioned within the housing for directing a spray of liquid against the inner tube stock.

7. An apparatus for manufacturing inner tubes comprising, a horizontally disposed tuber for extruding at its outlet inner tube stock in a substantially circular cross-section, a helical conveyor having a vertical axis, said conveyor comprising a series of closely spaced rollers arranged in a continuously and progressively descending path extending spirally around said vertical axis, to provide a series of rolling surfaces along which the extruded stock moves in a continuous downwardly spiral path, a driven conical roller positioned above the helical conveyor and adapted to direct the stock from the tuber to the conveyor, a housing forming a bottom and side enclosure for the principal portion of the helical conveyor, a horizontally disposed circular conveyor portion forming a part of the helical conveyor, an enclosing wall over the top of the circular conveyor portion, and conduits positioned within the housing for directing a spray of liquid against the inner tube stock.

8. An apparatus for manufacturing inner tubes comprising, a horizontally disposed tuber for extruding at its outlet inner tube stock in a substantially circular cross-section, a helical conveyor having a vertical axis, said conveyor comprising a series of closely spaced rollers arranged in a continuously and progressively descending path extending spirally around said vertical axis, to provide a series of rolling surfaces along which the extruded stock moves in a continuous downwardly spiral path, a driven conical roller positioned above the helical conveyor and adapted to direct the stock from the tuber to the conveyor, a housing forming a bottom and side enclosure for the principal portion of the helical conveyor, a horizontally disposed circular conveyor portion forming a part of the helical conveyor, an enclosing wall over the top of the circular conveyor portion, conduits positioned within the housing for directing a spray of liquid against the inner tube stock, and means within the enclosed wall circular housing conveyor portion for removing surface liquid from the inner tube stock.

9. An apparatus for manufacturing inner tubes comprising, a horizontally disposed tuber for extruding at its outlet inner tube stock in a substantially circular cross-section, a helical conveyor having a vertical axis, said conveyor comprising a series of closely spaced rollers arranged in a continuously and progressively descending path extending spirally around said vertical axis, to provide a series of rolling surfaces along which the extruded stock moves in a continuous downwardly spiral path, a driven conical roller positioned above the helical conveyor and adapted to direct the stock from the tuber to the conveyor, a housing forming a bottom and side enclosure for the principal portion of the helical conveyor, a continuation portion of the helical conveyor extending below said housing, and means along the continuation portion of the helical conveyor for applying powdered particles to the surface of the inner tube stock.

10. An apparatus for manufacturing inner tubes comprising, a horizontally disposed tuber for extruding at its outlet inner tube stock in a substantially circular cross-section, a helical conveyor having a vertical axis, said conveyor comprising a series of closely spaced rollers arranged in a continuously and progressively descending path extending spirally around said vertical axis, to provide a series of rolling surfaces along which the extruded stock moves in a continuous downwardly spiral path, a driven conical roller positioned above the helical conveyor and adapted to direct the stock from the tuber to the conveyor, a housing forming a bottom and side enclosure for the principal portion of the helical conveyor, a continuation portion of the helical conveyor extending below said housing, and means along the continuation portion of the helical conveyor for cutting the inner tube stock into unit lengths.

11. An apparatus for manufacturing inner tubes comprising, a horizontally disposed tuber for extruding at its outlet inner tube stock in a substantially circular cross-section, a helical conveyor having a vertical axis, said conveyor comprising a series of closely spaced rollers arranged in a continuously and progressively descending path extending spirally around said vertical axis, to provide a series of rolling surfaces along which the extruded stock moves in a continuous downwardly spiral path, a driven conical roller positioned above the helical conveyor and adapted to direct the stock from the tuber to the conveyor, a housing forming a bottom and side enclosure for the principal portion of the helical conveyor, conduits positioned within the housing for directing a spray of liquid against the inner tube stock, a continuation portion of the helical conveyor extending below said housing, means along the continuation portion of the helical conveyor for applying powdered particles to the surface of the inner tube stock, and means along the continuation portion of the helical conveyor for cutting the inner tube stock into unit lengths.

12. In an apparatus for extruding inner tubes of generally circular form, a tuber for extruding inner tube stock in a straight path along the axis of the tuber, a support for the extruded stock, a rotatable member having surfaces of varying diameters, said member being located at an angle offset from the axis of said tuber, and means for rotating said member in engagement with the stock to pull the stock at an angle from the extruder and deposit it on said support, the surface of larger diameter pulling a greater quantity of stock from said tuber than the surface of smaller diameter so that the extruded stock is deposited on said support in substantially circular form.

RAYMOND F. TERNES.

REFERENCES CITED

The following references are of record in the file of this patent:

UNITED STATES PATENTS

| Number | Name | Date |
|---|---|---|
| 1,382,207 | McGuire | June 21, 1921 |
| 1,594,845 | Myers | Aug. 3, 1926 |
| 1,643,999 | Semple | Oct. 4, 1927 |
| 1,674,574 | Semple | June 19, 1928 |
| 2,369,583 | Lucid | Feb. 13, 1945 |
| 2,423,147 | Hinman | July 1, 1947 |
| 2,501,584 | Schanz | Mar. 21, 1950 |